United States Patent
Erroui et al.

(10) Patent No.: US 12,027,839 B2
(45) Date of Patent: Jul. 2, 2024

(54) DEVICE FOR ELECTRICALLY CONNECTING CABLES COMPRISING A PLATE WITH ELECTRICALLY INSULATED DUCTS SURROUNDING BUSBARS

(71) Applicant: Airbus Operations SAS, Toulouse (FR)

(72) Inventors: Najoua Erroui, Toulouse (FR); Yann Dubarry, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 8 days.

(21) Appl. No.: 17/847,510

(22) Filed: Jun. 23, 2022

(65) Prior Publication Data
US 2022/0416520 A1  Dec. 29, 2022

(30) Foreign Application Priority Data

Jun. 28, 2021  (FR) ........................... 2106926

(51) Int. Cl.
*H02G 5/00*  (2006.01)

(52) U.S. Cl.
CPC ..................... *H02G 5/00* (2013.01)

(58) Field of Classification Search
None
See application file for complete search history.

(56) References Cited

U.S. PATENT DOCUMENTS

| | | | | |
|---|---|---|---|---|
| 2,318,859 A | * | 5/1943 | Huguelet | H02G 5/025 174/70 B |
| 3,113,820 A | * | 12/1963 | Norden | H02B 1/21 174/68.2 |
| 3,774,145 A | * | 11/1973 | Vlahos | H01R 4/24 439/724 |
| 4,556,282 A | * | 12/1985 | Delebecque | G02B 6/3806 385/65 |
| 5,041,007 A | * | 8/1991 | Liu | H01R 12/675 439/404 |
| 5,327,643 A | * | 7/1994 | Sakamoto | H01R 43/01 174/72 A |
| 5,486,651 A | * | 1/1996 | Morgan | H02G 5/007 174/68.2 |

(Continued)

FOREIGN PATENT DOCUMENTS

| | | |
|---|---|---|
| CN | 106299925 B | 5/2018 |
| FR | 3073337 A1 | 5/2019 |

(Continued)

OTHER PUBLICATIONS

French Search Report; priority document.

*Primary Examiner* — Krystal Robinson
(74) *Attorney, Agent, or Firm* — Greer, Burns & Crain, Ltd.

(57) ABSTRACT

A device for electrically connecting cables where a change of direction occurs. The device includes at least two busbars as well as a plate having independent internal ducts in which the busbars are located, each duct being electrically insulated from the other ducts, the busbars ensuring electrical conduction from one open end of a duct to the other end. The cables are fastened at these open ends and thus do not undergo any deformation, the change of direction taking place inside the plate with the aid of the busbars.

16 Claims, 2 Drawing Sheets

(56) References Cited

U.S. PATENT DOCUMENTS

| | | | | |
|---|---|---|---|---|
| 6,180,885 B1* | 1/2001 | Goldman | ............... | H02G 5/06 |
| | | | | 174/68.2 |
| 2002/0041110 A1* | 4/2002 | Odashima | ............. | B60J 5/0416 |
| | | | | 296/146.7 |
| 2006/0099851 A1* | 5/2006 | Duarte | ............... | H01R 13/567 |
| | | | | 439/502 |
| 2008/0123256 A1* | 5/2008 | Fuzetti | ................. | H01R 4/363 |
| | | | | 174/99 B |
| 2010/0307813 A1* | 12/2010 | Randerath | ......... | B64D 11/0015 |
| | | | | 174/491 |
| 2010/0319954 A1* | 12/2010 | Ramsey | ................. | H02G 5/08 |
| | | | | 174/68.2 |
| 2014/0014409 A1* | 1/2014 | Lin | ..................... | H05K 1/117 |
| | | | | 174/75 R |
| 2019/0312439 A1 | 10/2019 | Cottrell et al. | | |
| 2020/0006927 A1 | 1/2020 | O'Shaughnessy et al. | | |
| 2020/0280180 A1* | 9/2020 | Francisquini | ........... | H01B 5/06 |

FOREIGN PATENT DOCUMENTS

| | | |
|---|---|---|
| GB | 2575107 A | 1/2020 |
| WO | 2018054621 A1 | 3/2018 |

\* cited by examiner

DEVICE FOR ELECTRICALLY CONNECTING CABLES COMPRISING A PLATE WITH ELECTRICALLY INSULATED DUCTS SURROUNDING BUSBARS

CROSS-REFERENCES TO RELATED APPLICATIONS

This application claims the benefit of the French patent application No. 2106926 filed on Jun. 28, 2021, the entire disclosures of which are incorporated herein by way of reference.

FIELD OF THE INVENTION

The present invention relates to the field of electrical distribution between items of equipment, more particularly of an aircraft. It applies, in particular, to high-voltage, direct current (HVDC) electrical installations.

BACKGROUND OF THE INVENTION

The items of electrical equipment of an aircraft have to be supplied with power and, to this end, comprise electric power cable harnesses. Because of the constrained and limited environment of the aircraft, changes of direction are often necessary in a restricted area of space. However, it is necessary to respect electrical insulation distances, and these distances can prove to be significant when harnesses of numerous electric cables to be managed in a limited space, as well as the number of connections to be taken charge of, are considered.

The application FR3073337 filed by Airbus Operations SAS describes a modular element comprising a busbar which can be juxtaposed with another element which allows distribution between items of electrical equipment by juxtaposed busbars. As the figures of the patent demonstrate, changes of direction are not taken into account. The busbars are aligned along the longitudinal direction of the aircraft or the airfoil or otherwise.

The present invention aims to provide an advantageous alternative solution to twisting power cables in the context of a change of direction.

SUMMARY OF THE INVENTION

For this purpose, the present invention relates to a connection device for electrically connecting cables comprising at least two busbars, characterized in that it comprises a plate having at least two independent internal ducts in which the busbars are located, each duct being electrically insulated from the other ducts, the busbars ensuring electrical conduction from one open end of a duct to the other end.

The cables are fastened at these open ends and thus do not undergo any deformation, the change of direction taking place inside the plate with the aid of the busbars.

The invention provides at least one of the following optional features, taken individually or in combination.

The busbars are electrically insulated from one duct to the next.

The walls of the ducts are composed of an electrically insulating material.

The entry and exit ends of the same duct are transversely offset.

The plate is at least partially rigid.

The ducts comprise one or more elbows dividing the ducts into a plurality of branches extending in different directions.

The ducts have, from one duct to the next, parallel longitudinal branches.

The ducts have, from one duct to the next, at least partially contiguous branches.

The ducts have, from one duct to the next, parallel transverse branches.

The ducts referred to as the end ducts, located as close as possible to edges of the plate, have two branches and an L shape and the other ducts, referred to as the central ducts and located between the end ducts, have three branches, the central branch of which is parallel to the central branches of the other central ducts.

The plate is parallelepipedal with a rectangular cross section.

The ducts are parallelepipedal with a rectangular cross section which is slightly larger than that of the associated busbar, so that the busbar is enveloped by the duct.

One of the walls of a duct can be at least partially shared with a wall of another duct.

The present invention also pertains to an electrical assembly comprising at least four cables and a connection device having one or more of the preceding features, the end of cables referred to as the cables entering the connection device having to be connected to the end of cables referred to as the exiting cables, which are not in alignment, characterized in that the end of the entering cables is respectively fastened at an open end of a duct located at one edge of the plate and the end of the exiting cables is respectively fastened at an open end of a duct located at another edge of the plate, the cables to be associated being connected by the same duct.

According to an optional feature, the ends of the cables are crimped inside the open ends of the ducts.

The present invention pertains to any structure, such as an aircraft, equipped with items of the electrical equipment, as well as electrical assemblies which make it possible to connect them and comprise one or more of the previously presented optional features, the connection devices making it possible to ensure changes of direction between the cables which make it possible to connect the items of equipment.

BRIEF DESCRIPTION OF THE DRAWINGS

Other aims, features and advantages will become apparent from the following description of the invention, which description is given by way of solely non-limiting example, with reference to the accompanying drawings, in which.

DETAILED DESCRIPTION OF THE PREFERRED EMBODIMENTS

Figure 1:
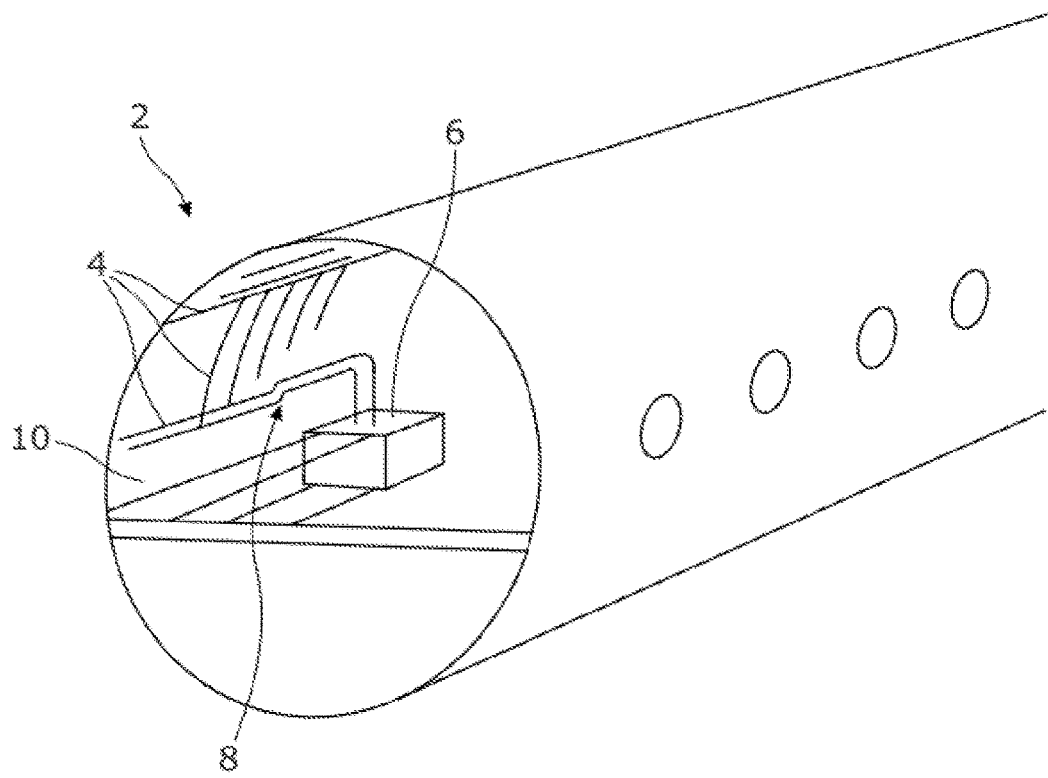
FIG. 1 is a simplified and partial perspective view of an aircraft section in which some of the items of equipment and cables connecting them are highlighted.

As shown in FIG. 1, in an aircraft 2 very many and significant lengths of cables 4 extend in order to ensure electrical distribution between items of equipment 6, and, in particular, high-voltage, direct current ones. Taking into account the restricted, confined space in which the cables 4 have to be installed, changes 8 of direction are necessary in their journey along the fuselage 10 or elsewhere. However, as indicated above, it is imperative to respect electrical insulation distances between cables, which does not make them easy to position. The aim of the present invention is to make it possible to respect the insulation distances while limiting the space allocated to the change of direction and to avoid twisting cables 4 as required by a change 8 of direction, which damages them over time.

Figure 2:
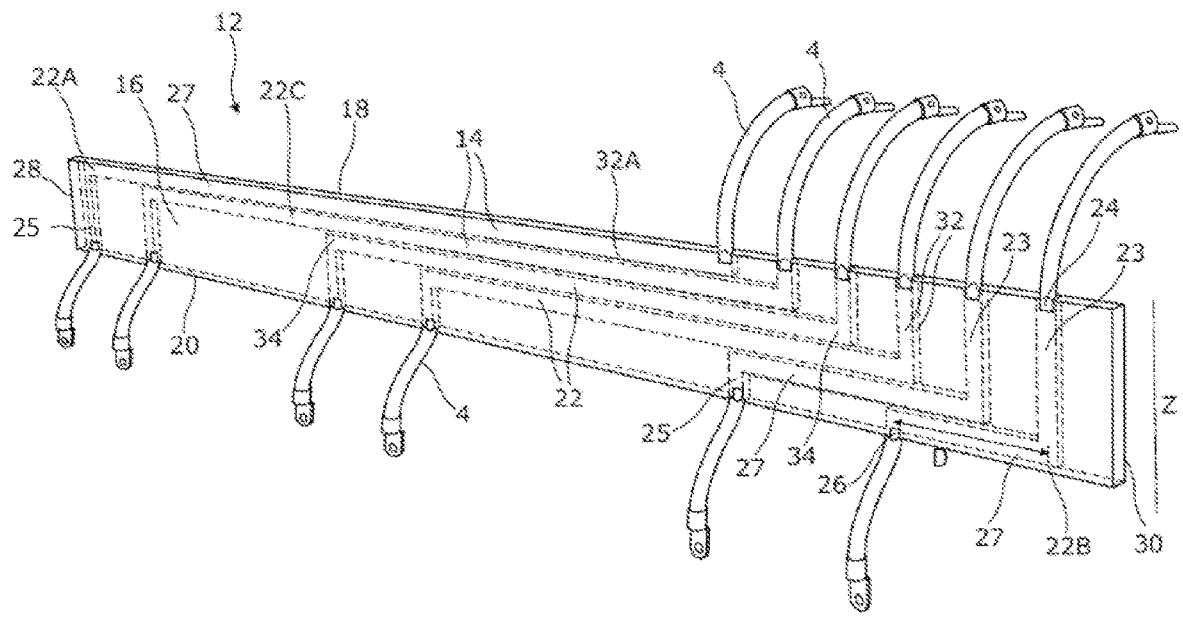
FIG. 2 is a perspective view of a set of cables which are associated with a connection device according to the present invention, the internal space of which is visible by transparency.
Figure 3:
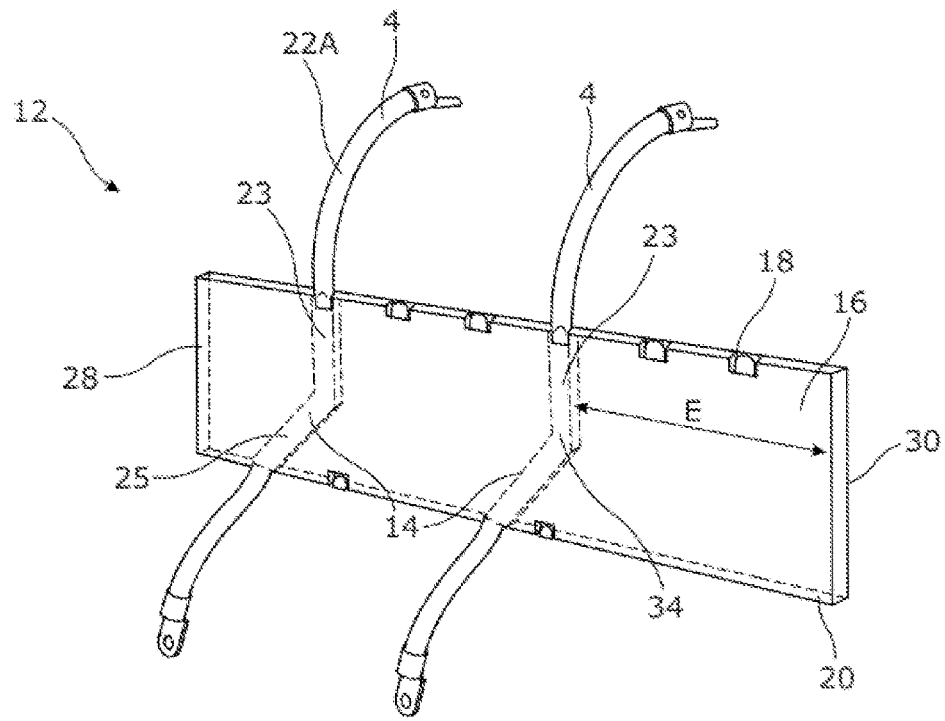
FIG. 3 is a perspective view of a set of cables which are associated with a connection device according to an embodiment other than that of FIG. 2, and the internal space of which is visible by transparency.
Figure 4:
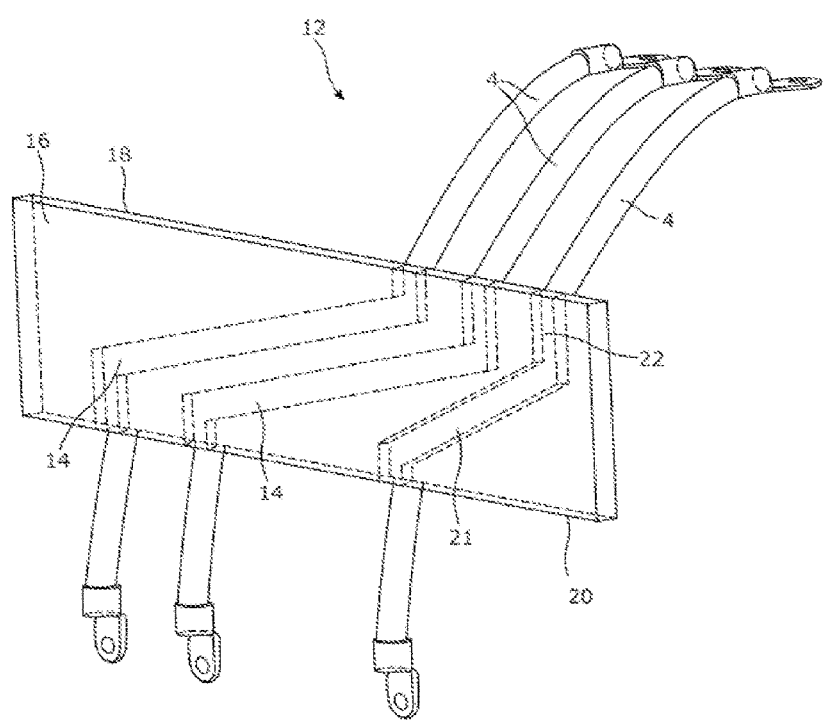
FIG. 4 is a perspective view of a set of cables which are associated with a connection device according to an embodiment other than that of FIGS. 2 and 3, and the internal space of which is visible by transparency.

As illustrated in FIGS. 2 to 4, which show three different embodiments, the present invention pertains to a device 12 for electrically connecting cables 4 where a change of direction occurs. The connection device 12 comprises at least two busbars 14. As seen above, "busbar" is a term commonly understood to designate electrical conductors in the form of flat bars or of tubes, the properties of which will not be recalled here. The connection device 12 also comprises a plate 16 having at least two independent internal ducts 22 in which the busbars 14 are located, each duct being electrically insulated from the other ducts. In this way, the connection device 12 offers both the possibility of combining cables and busbars in order to allow any type of change of direction while ensuring the cables are protected in an electrical routing device which is compact and not bulky. As a result of being integrated into a plate, the longitudinal axes of the ducts are located in the same plane or planes which are parallel to one another. The (one or more) busbars 14 associated with a duct 22 ensure electrical conduction from the entry end 24 to the exit end 26 of the duct 22. The sole purpose of the terms "entering" and "exiting" is to distinguish the two ends of a duct 22, cables associated by the duct or ends of the cables. According to one embodiment, the busbars 14 can be reinforced in order to be able to be used as a support and locally attach the plate to the structure of the aircraft 2. According to another embodiment, the plate 16 can be used alone or in combination with the busbars for fastening to the structure of the aircraft.

Each duct 22 opens, at each of its ends 24, 26, at a respective edge 18, 20 of the plate 16. Each duct comprises one branch 21 (embodiment of FIG. 4) or a plurality of branches 23, 25, 27 (embodiments of FIGS. 2 and 3). Each duct 22 has an end 24 opening at one of the edges 18, referred to as the entry end, and another end 26 opening at another edge 20, referred to as the exit end, the branch comprising the entry end being called the entry branch 21, 23, 27 and the one comprising the exit end being called the exit branch 21, 25, 27. If the duct comprises a single branch 21 (FIG. 4), the entry branch is identical to the exit branch.

In the remainder of the description, the terms "transverse" and "longitudinal" define two directions which are perpendicular with respect to one another, the transverse direction designating the direction Z in which current flows the shortest way from one edge 18 of the plate 16 to another edge 20 without a change of direction. In the case, for example, of a plate of rectangular parallelepipedal shape, the transverse direction Z corresponds, as depicted in FIG. 2, to the direction which is parallel to the shortest edges 28, 30. In the embodiments illustrated in FIGS. 2 to 4, the plate is not put in place in a given electrical environment: thus, the cables do not extend in a given direction.

According to the present invention, the entry end 24 and the exit end 26 of a duct 22 are transversely offset. The term "offset" means that the exit end 26 is not located in the axis of transverse direction Z passing through the entry open end 24. There is an offset D: in FIG. 2, if the duct closest to the edge 30 is considered, the offset corresponds to the length of the exit branch 27. The exit end 26 is not located opposite the entry end 24, and this is so precisely to allow a change of direction. The connection device 12 thus makes it possible to electrically connect two cables 4 which are transversely offset by a large distance.

The plate 16 comprises internal ducts 22, the walls 32 of which, made of insulating material, make it possible to electrically insulate each duct from the other ducts. Other means for insulating one duct with respect to another of known type may be possible. Inside each duct 22 there is located one busbar 14 or a plurality of contiguous busbars which adjoin one another in order to form a continuous electrical line all along the duct. As a result of surrounding the one or more busbars 14 with insulating walls, the risks of electric arcs are eliminated while respecting electromagnetic compatibility. As a result, the busbars 14 can be very close to one another, contrary to the prior art, in which a distance between cables has to be respected in order to avoid electric arc problems, which distance poses a problem in terms of bulk. Thus, a duct 22 can, according to the illustrated embodiment, at least partially abut the neighboring duct. According to one particular embodiment, one wall 32 of a duct can be at least partially shared, for example the wall 32A in FIG. 2, with a wall of the neighboring duct 22.

In the embodiments of FIGS. 2 and 3, the ducts 22 have at least one elbow 34 (that is to say, a bend), namely at a place in the duct where the duct assumes a different orientation, making it possible to ensure the change of direction between the entry cable and the exit cable.

In the illustrated embodiment, the cross section of the ducts 22 is slightly larger than that of the associated busbars 14, so that the walls 32 of the duct envelop the associated busbar and, according to one particular embodiment, as close as possible to the busbar. However, as a result of the duct forming one or more elbows 34 in order to ensure the change of direction, it is possible to leave a clearance between the busbar and the duct, the busbar not being able to escape from the duct as a result of the one or more elbows.

According to the embodiment illustrated in FIG. 2, the ducts 22 inside the plate 16 comprise two or three rectilinear branches 23, 25, 27 which are perpendicular with respect to one another, the connection between two branches forming the elbow 34. The branches 23 are referred to as entry branches. The branches 25 are referred to as exit branches. The branches 27 are entry or exit branches for ducts with two branches and central branches for central ducts. The ducts 22 have, from one duct to the next, parallel longitudinal branches 27. The parallel branches can be at least partially contiguous, or abutting; they can in this case, as seen above, have an at least partially shared wall 32A. The ducts have, from one duct to the next, parallel transverse branches 23, 25. The transverse branches 23, 25 are the branches in which the busbars are connected to the entering and exiting cables. They therefore cannot abut, in order to make it possible to keep a distance between cables at the entry of the plate.

In the embodiment illustrated in FIG. 1, the ducts 22 located closest to the longitudinal 18, 20 and transverse 28, 30 edges of the plate are referred to as the end edges 22A, 22B. The ducts located between the end ducts 22A, 22B are referred to as the central ducts 22C. The end ducts 22A, 22B have two branches 23, 27 and 27, 25 which are perpendicular to one another in order to form an L. Other embodiments could be envisaged in which, for example, the end ducts would have three branches. The central ducts 22C have three branches 23, 25, 27 which are perpendicular to one another; the central longitudinal branches 27 of the central ducts 22C are parallel to one another. The transverse branches 23, 25 of the central ducts 22C are also parallel to one another. The transverse branches 23, 25 of the end ducts 22A, 22B are parallel to one another and parallel to the transverse branches 23, 25 of the central ducts 22C, and their longitudinal branches 27 are also parallel to one another and parallel to the longitudinal branches 27 of the central ducts 22C. Thus, the branches of the central and end ducts orientated in a longitudinal direction are parallel to one another and those orientated in a transverse direction are parallel to one another.

In the embodiment of FIG. 4, the duct 22 comprises a single branch 21. The branches 21 of the ducts 22 can be parallel as well as not parallel to one another. Only some of the branches 21 can also, according to another embodiment, be parallel to one another. In the embodiment illustrated in FIG. 4, the branches 21 are not parallel to one another.

In the embodiment illustrated in FIGS. 2 to 4, the plate 16 corresponds to a rectangular parallelepiped. In this way, in the embodiments of FIGS. 2 and 3, the transverse and longitudinal branches of the end 22A, 22B and central 22C ducts are parallel to the transverse sides or to the longitudinal sides of the plate, respectively. They follow transverse or longitudinal directions, respectively. Thus, in the embodiment of FIG. 2, the transverse or longitudinal branches of the end ducts 22A, 22B can run along the transverse 28, 30 or longitudinal 18, 20 edges of the plate, respectively, in order to optimize the size of the plate, so that the dimensions of the plate are as small as possible in order to reduce, as far as possible, the space taken up by the plate. However, space E can also be provided between the transverse edges 28, 30 of the plate and the transverse branch 23 of the end ducts 22A, 22B, as illustrated in FIG. 3.

In the embodiments illustrated in FIGS. 2 to 4, the ducts are parallelepipedal with a rectangular cross section in order to receive flat busbars. The cross section of the duct is slightly larger than the cross section of the associated busbar, so that the busbar is enveloped by the duct as seen above.

The plate 16 is at least partially rigid, in opposition to the cables, which are flexible, namely it cannot be deformed like the cables. In this way it is easy to manipulate. According to one embodiment, the plate is rigid overall. The walls 32 of the ducts 22 of the plate are composed of an insulating material. They could also be coated with an electrically insulating device or material which makes it possible to insulate the ducts from one another. According to one embodiment, the whole of the plate is at least partially, and in the embodiment for the most part, composed of an insulating material. Areas where metal plating resumes located near the ends 24, 26 are, for example, provided. The plate can be, for example, solid and made of insulating material, in which ducts are provided. It can also comprise hollow portions in addition to the ducts. It can be produced by 3D printing, by machining, milling and/or any other technology. It could, according to other embodiments, be composed of a plurality of materials. According to one particular embodiment, it is possible to cover the plate with a shielding layer in order to enhance the insulation. As the figures show the plate by transparency, this layer covers the plate but is not visible.

The plate 16 is a connection device of an electrical assembly. The electrical assembly comprises at least four cables 4 as well as the plate 16. The plate 16 makes it possible to connect, in pairs, cables 4 which are not in alignment and, without the electrical connection device presented here, one or other or both of which would need to be twisted in order to join them. The end of the entering cables has to be connected to the end of the exiting cables, which are not in alignment. To this end, the end of the entering cables is respectively fastened at an open end 24 of a duct 22 located at one edge 18 of the plate, and the end of the exiting cables is respectively fastened at an open end 26 of a duct 22 located at another edge 20 of the plate, the one associated by the duct with the open end the entering cable of which has to be associated with the exiting cable.

The ends of the cables are crimped inside the open ends of the ducts. However, other types of fastening are possible, such as welding or others.

By virtue of the plate 16, the distance between cables 4 is respected, the electrical connections ensuring a change of direction being protected from any damage while reducing the space allocated to the plate in comparison with that which would have been necessary without the described connection device 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for electrically connecting cables comprising:
   at least two busbars,
   a plate having at least two independent internal ducts in which said busbars are located, wherein the plate is parallelepipedal with a rectangular cross section,
      each duct being electrically insulated from other ducts,
      said busbars ensuring electrical conduction from one open end of a duct to an opposite end.

2. The device according to claim 1, wherein the busbars are electrically insulated from one duct to another.

3. The device according to claim 1, wherein entry and exit ends of a same duct are transversely offset.

4. The device according to claim 1, wherein the plate is at least partially rigid.

5. The device according to claim 1, wherein the ducts comprise one or more elbows dividing each of the ducts into a plurality of branches extending in different directions.

6. The device according to claim 1, wherein the ducts are parallelepipedal with a rectangular cross section which is slightly larger than that of an associated busbar, so that the associated busbar is enveloped by the duct.

7. The device according to claim 1, wherein one wall of at least one of the at least two ducts is at least partially shared with a wall of another duct.

8. An electrical assembly comprising:
   at least four cables, and
   a connection device comprising at least two busbars and a plate having at least two independent internal ducts in which said busbars are located, each duct being electrically insulated from other ducts, and said busbars ensuring electrical conduction from one open end of a duct to an opposite end,
an end of the cables referred to as cables entering the connection device having to be connected to an end of cables referred to as the exiting cables, which are not in alignment,
wherein the end of the entering cables is respectively fastened at an open end of a duct located at one edge of the plate and the end of the exiting cables is respectively fastened at an open end of a duct located at another edge of the plate, the cables to be associated being connected by the same duct.

9. The electrical assembly according to claim 8, wherein the ends of the cables are crimped inside the open ends of the ducts.

10. The electrical assembly according to claim 8, wherein the busbars are electrically insulated from one duct to another.

11. The electrical assembly according to claim 8, wherein entry and exit ends of a same duct are transversely offset.

12. The electrical assembly according to claim 8, wherein the plate is at least partially rigid.

13. The electrical assembly according to claim 8, wherein the ducts comprise one or more elbows dividing each of the ducts into a plurality of branches extending in different directions.

14. The electrical assembly according to claim 8, wherein the plate is parallelepipedal with a rectangular cross section.

15. The electrical assembly according to claim 8, wherein the ducts are parallelepipedal with a rectangular cross section which is slightly larger than that of an associated busbar, so that the associated busbar is enveloped by the duct.

16. The electrical assembly according to claim 8, wherein one wall of at least one of the at least two ducts is at least partially shared with a wall of another duct.

\* \* \* \* \*